United States Patent
Kim (10) Patent No.: US 11,645,010 B2
(45) Date of Patent: May 9, 2023

(54) SOLID STATE DRIVE (SSD) MEMORY SYSTEM IMPROVING THE SPEED OF A READ OPERATION USING PARALLEL DMA DATA TRANSFERS

(71) Applicant: SK hynix Inc., Gyeonggi-do (KR)

(72) Inventor: Do Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 156 days.

(21) Appl. No.: 17/363,549

(22) Filed: Jun. 30, 2021

(65) Prior Publication Data

US 2021/0326075 A1  Oct. 21, 2021

Related U.S. Application Data

(63) Continuation of application No. 16/205,950, filed on Nov. 30, 2018, now abandoned.

(30) Foreign Application Priority Data

Apr. 25, 2018 (KR) .......................... 10-2018-0047974

(51) Int. Cl.
G06F 3/06 (2006.01)
G06F 13/28 (2006.01)

(52) U.S. Cl.
CPC .......... *G06F 3/0659* (2013.01); *G06F 3/0604* (2013.01); *G06F 3/0656* (2013.01);
(Continued)

(58) Field of Classification Search
None
See application file for complete search history.

(56) References Cited

U.S. PATENT DOCUMENTS

| 5,797,033 | A | 8/1998 | Ecclesine |
| 7,620,748 | B1 * | 11/2009 | Bruce ............... G06F 13/28 |
| | | | 710/308 |

(Continued)

FOREIGN PATENT DOCUMENTS

| CN | 1352773 A | 6/2002 |
| CN | 1552028 A | 12/2004 |

(Continued)

OTHER PUBLICATIONS

First Office Action issued by Chinese Patent Office for the Application No. 201811599633.3 dated Sep. 5, 2022.

*Primary Examiner* — Jared I Rutz
*Assistant Examiner* — Marwan Ayash
(74) *Attorney, Agent, or Firm* — IP & T Group LLP (57) ABSTRACT

There are provided a memory system and an operating method thereof. The memory system includes: a memory device for storing data in a program operation, and reading stored data and temporarily store the read data in a read operation; and a controller for transmitting data to the memory device, wherein the controller includes: a flash direct memory access (DMA) for reading and outputting the data temporarily stored in the memory device in the read operation; a buffer memory for storing the data output from the flash DMA; and a host DMA for reading the data stored in the buffer memory and outputting the read data to a host, wherein a first operation of storing the data temporarily stored in the memory device in the buffer memory and a second operation of outputting the data stored in the buffer memory to the host are performed in parallel.

12 Claims, 8 Drawing Sheets

(52) U.S. Cl.
CPC ............ *G06F 3/0679* (2013.01); *G06F 13/28* (2013.01); *G06F 2213/28* (2013.01)

(56) References Cited

U.S. PATENT DOCUMENTS

| | | | |
|---|---|---|---|
| 9,971,524 B1* | 5/2018 | Bruce | G06F 3/0617 |
| 10,552,050 B1* | 2/2020 | Verdan | G06F 3/0659 |
| 2010/0229032 A1 | 9/2010 | Lee | |
| 2014/0149625 A1 | 5/2014 | Sharifie et al. | |
| 2017/0235687 A1* | 8/2017 | Park | G06F 3/0659 |
| | | | 710/22 |

FOREIGN PATENT DOCUMENTS

| | | | |
|---|---|---|---|
| CN | 1952917 | A | 4/2007 |
| CN | 1965285 | A | 5/2007 |
| CN | 101373449 | A | 2/2009 |
| CN | 103136136 | A | 6/2013 |
| CN | 104011696 | A | 8/2014 |
| CN | 105389274 | A | 3/2016 |
| CN | 105608015 | A | 5/2016 |
| CN | 105845177 | A | 8/2016 |
| CN | 106098089 | A | 11/2016 |
| CN | 106128510 | A | 11/2016 |
| CN | 106373602 | A | 2/2017 |
| CN | 107066201 | A | 8/2017 |
| CN | 107643985 | A | 1/2018 |
| KR | 10-2007-0068809 | A | 7/2007 |

\* cited by examiner

SOLID STATE DRIVE (SSD) MEMORY SYSTEM IMPROVING THE SPEED OF A READ OPERATION USING PARALLEL DMA DATA TRANSFERS

CROSS-REFERENCE TO RELATED APPLICATION

This application is a continuation of U.S. patent application Ser. No. 16/205,950 filed on Nov. 30, 2018, which claims benefits of priority of Korean Patent Application No. 10-2018-0047974 filed on Apr. 25, 2018. The disclosure of each of the foregoing application is incorporated herein by reference in its entirety.

BACKGROUND

1. Field of Invention

The present disclosure generally relates to a memory system and an operating method thereof, and more particularly, to a memory system capable of improving the speed of a read operation and an operating method of the memory system.

2. Description of Related Art

The paradigm on recent computer environment has shifted to ubiquitous computing in which computing systems can be used anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

Such a data storage device has excellent stability and durability, high information access speed, and low power consumption, since there is no mechanical driving part. In memory systems having such advantages, the data storage device includes a universal serial bus (USB) memory device, memory cards having various interfaces, a solid state drive (SSD), and the like.

SUMMARY

Embodiments provide a memory system capable of improving the operation speed of a read operation of outputting data read from a memory device to a host and an operating method of the memory system.

According to an aspect of the present disclosure, there is provided a memory system including: a memory device configured to store data in a program operation, and read stored data and temporarily store the read data in a read operation; and a controller configured to transmit data to the memory device, wherein the controller includes: a flash direct memory access (DMA) configured to read and output the data temporarily stored in the memory device in the read operation; a buffer memory configured to store the data output from the flash DMA; and a host DMA configured to read the data stored in the buffer memory and output the read data to a host, wherein a first operation of storing the data temporarily stored in the memory device in the buffer memory and a second operation of outputting the data stored in the buffer memory to the host are performed in parallel, wherein, during the first operation, when a portion of the data from the flash DMA is output, the buffer memory secures a space for storing the data output from the flash DMA.

According to another aspect of the present disclosure, there is provided a memory system including: a memory device configured to store data; a host interface coupled to a host; a buffer memory coupled between the memory device and the host interface; a first controller configured to read data stored in the memory device and transmit the read data to the buffer memory; and a second controller configured to output data stored in the buffer memory to the host through the host interface, wherein a first operation of transmitting, by the first controller, the read data to the buffer memory and a second operation of outputting, by the second controller, the data stored in the buffer memory to the host are performed in parallel.

According to still another aspect of the present disclosure, there is provided a method for operating a memory system, the method including: dividing data read from a memory device into multiple data sub-groups; performing a first operation of sequentially transmitting the multiple data sub-groups to a buffer memory and storing the multiple data sub-groups in the buffer memory; and performing a second operation of reading data stored in the buffer memory and outputting the read data to a host, when a first data sub-group among the multiple data sub-groups is completely stored in the buffer memory, wherein the first operation and the second operation are performed in parallel.

BRIEF DESCRIPTION OF THE DRAWINGS

Various embodiments will now be described more fully with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete and fully conveys the scope of the embodiments to those skilled in the art. Also, throughout the specification, reference to "an embodiment" or the like is not necessarily to only one embodiment, and different references to any such phrase are not necessarily to the same embodiment(s).

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional description herein is for the purpose of describing embodiments of the present disclosure. The embodiments can be implemented in various different ways, and thus the present invention is not limited to the embodiments set forth herein.

The embodiments can be variously modified to provide different arrangements. While various embodiments are illustrated and described in detail, the present invention is not limited to the specifics disclosed. Rather, the present invention includes all changes, equivalents and substitutes that fall within the spirit and scope of the present disclosure.

While terms such as "first" and "second" may be used to identify various components, such components are not limited by those terms. Rather, such terms are used only to distinguish one component from another that otherwise have the same or similar names. For example, a first component in one instance may be referred to as a second component in another instance and vice versa without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Similarly, communication between two elements may be direct or indirect, and in either case, wired or wireless, unless the context indicates otherwise. Other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including" or "having," etc., are intended to indicate the existence of the features, numbers, operations, actions, components, parts, or combinations thereof but are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

In describing embodiments, description of techniques that are well known to the art to which the present disclosure pertains and not directly related to the present disclosure is omitted. This is done so as not to unnecessarily obscure the present invention.

Various embodiments of the present disclosure will be described in detail with reference to the accompanying drawings in order for those skilled in the art to be able to readily practice the present invention.

Figure 1:
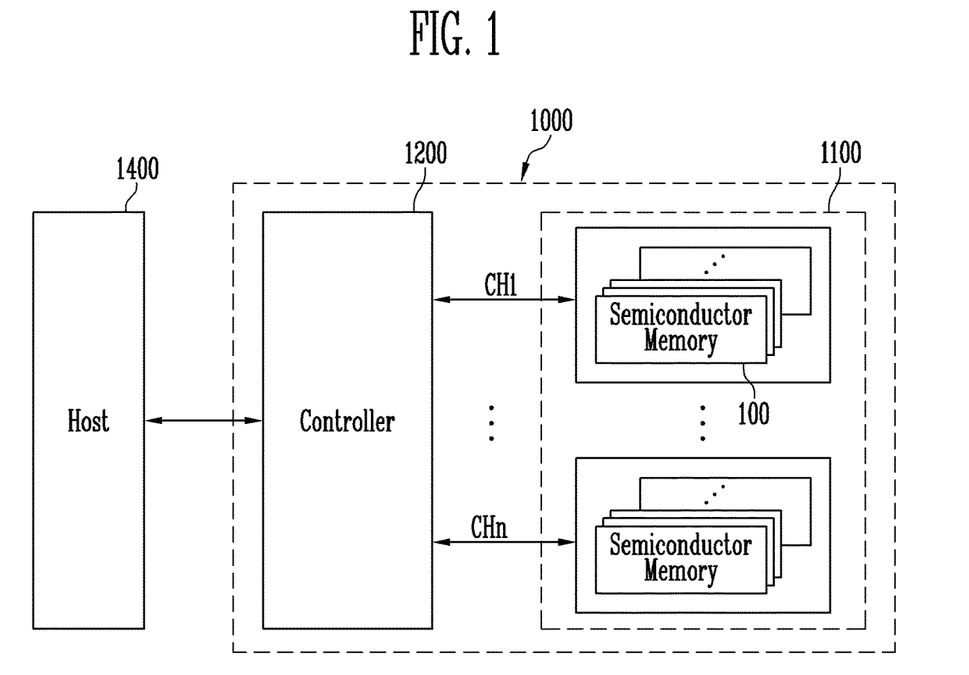
FIG. 1 is a block diagram illustrating a memory system according to an embodiment of the present disclosure.

FIG. 1 is a block diagram illustrating a memory system 1000 according to an embodiment of the present disclosure.

Referring to FIG. 1, the memory system 1000 includes a memory device 1100 and a controller 1200. The memory device 1100 includes a plurality of semiconductor memories 100. The plurality of semiconductor memories 100 may be divided into a plurality of groups.

FIG. 1 illustrates that the plurality of groups (e.g., n groups) communicate with the controller 1200 respectively through first to nth channels CH1 to CHn. Each semiconductor memory 100 will be described later with reference to FIG. 3.

Each of the semiconductor memories in a particular group is configured to communicate with the controller 1200 through one common channel. The controller 1200 is configured to control the plurality of semiconductor memories 100 of the memory device 1100 through the plurality of channels CH1 to CHn.

The controller 1200 is coupled between a host 1400 and the memory device 1100. The controller 1200 is configured to access the memory device 1100 in response to a command received from the host 1400. For example, the controller 1200 is configured to control read, program, erase, and background operations of the memory device 1100 in response to a command received from the host 1400. The controller 1200 is configured to provide an interface between the memory device 1100 and the host 1400. The controller 1200 is configured to drive firmware for controlling the memory device 1100.

When a read command is received from the host 1400, the controller 1200 may control the memory device 1100 to perform a read operation by generating an internal command corresponding to the read command and outputting the internal command to the memory device 1100. Also, the controller 1200 may temporarily store data read from the memory device 1100 in a buffer memory (e.g., a buffer memory 1270 of FIG. 2) of the controller 1200, and output the data stored in the buffer memory to the host 1400. An operation of transmitting data from the memory device 1100 to the buffer memory and an operation of transmitting data from the buffer memory to the host 1400 may be performed in parallel. That is, the operation of transmitting the data from the memory device 110 to the buffer memory and the operation of transmitting the data from the buffer memory to the host 1400 may overlap with each other for a period of time.

The host 1400 controls the memory system 1000. The host 1400 includes portable electronic devices such as a computer, a PDA, a PMP, an MP3 player, a camera, a camcorder, and a mobile phone. The host 1400 may request a program, read or erase operation of the memory system 1000 through a command.

The controller 1200 and the memory device 1100 may be integrated into one semiconductor device. In an exemplary embodiment, the controller 1200 and the memory device 1100 may be so integrated to constitute a memory card such as a personal computer (PC) memory card (e.g., personal computer memory card international association (PCM-CIA)), a compact flash (CF) card, a smart media card (e.g., SM or SMC), a memory stick, a multi-media card (e.g., MMC, RS-MMC or MMCmicro), a secure digital (SD) card (e.g., SD, miniSD, microSD or SDHC), or a universal flash storage (UFS).

The controller 1200 and the memory device 1100 may be integrated into one semiconductor device to constitute a semiconductor drive (e.g., solid state drive (SSD)). The semiconductor drive SSD includes a storage device configured to store data in a semiconductor memory. If the memory system 1000 is used as the semiconductor drive SSD, the operating speed of the host 1400 coupled to the memory system 1000 may be remarkably improved.

In another example, the memory system 1000 may be provided as one of various components of an electronic device such as a computer, an ultra mobile personal computer (UMPC), a workstation, a net-book, a personal digital assistant (PDA), a portable computer, a web tablet, a wireless phone, a mobile phone, a smart phone, an e-book, a portable multi-media player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an exemplary embodiment, the memory device 1100 or the memory system 1000 may be packaged in various forms. For example, the memory device 1100 or the memory system 1000 may be packaged in any of the following forms: Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), Plastic Metric Quad Flat Pack (PMQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi-Chip Package (MCP), Wafer-level Fabricated Package (WFP), or Wafer-level processed Stack Package (WSP).

Figure 2:
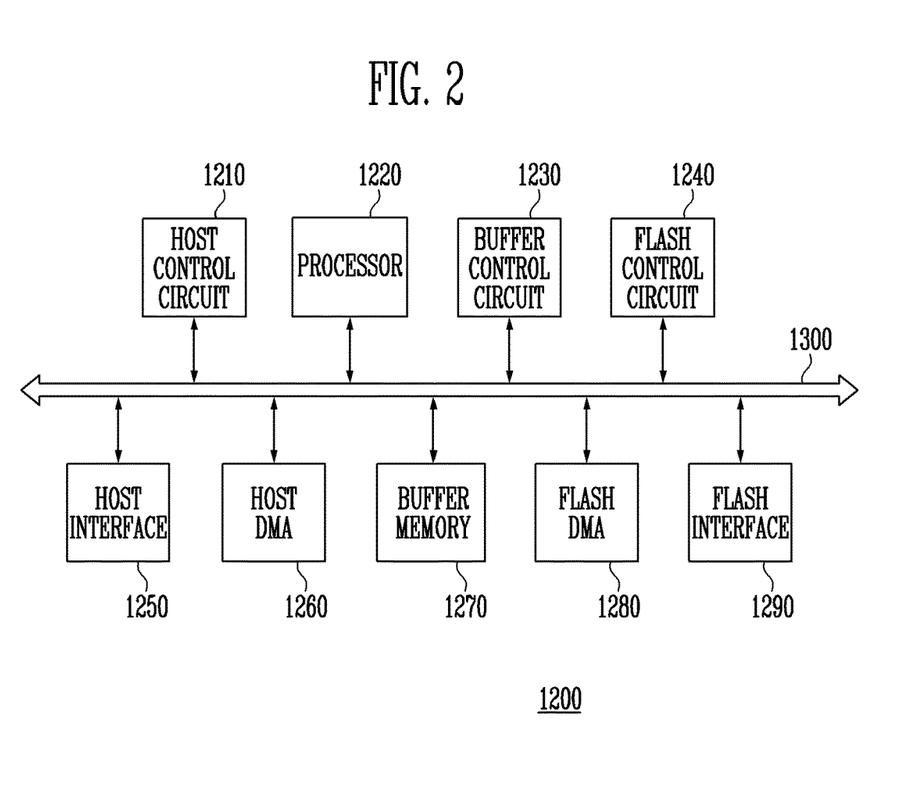
FIG. 2 is a block diagram illustrating a controller according to an embodiment of the present disclosure.

FIG. 2 is a block diagram illustrating a controller according to an embodiment of the present disclosure, for example, the controller 1200 of FIG. 1.

Referring to FIG. 2, the controller 1200 may include a host control circuit 1210, a processor 1220, a buffer control circuit 1230, a flash control circuit 1240, a host interface 1250, a host direct memory access (DMA) 1260, a buffer memory 1270, a flash DMA 1280, a flash interface 1290, and a bus 1300.

The bus 1300 may be configured to provide channels between components of the controller 1200.

The host control circuit 1210 may control data transmission between the host 1400 of FIG. 1 and the buffer memory 1270. In an example, the host control circuit 1210 may control an operation of storing data received from the host 1400 through the host interface 1250 in the buffer memory 1270 by driving the host DMA 1260. In another example, the host control circuit 1210 may control an operation of outputting data stored in the buffer memory 1270 to the host 1400 through the host interface 1250 by driving the host DMA 1260.

The processor 1220 may control the overall operations of the controller 1200, and perform a logical operation. The processor 1220 may communicate with the host 1400 of FIG. 1 through the host interface 1250, and communicate with the memory device 1100 of FIG. 1 through the flash interface 1290. The processor 1220 may control the buffer memory 1270 through the buffer control circuit 1230. The processor 1220 may control an operation of the memory system 1000 by using the buffer memory 1270 as a working memory, a cache memory or a buffer memory. Also, when a command is received from the host 1400, the processor 1220 may control the flash control circuit 1240 by queuing the command. Also, the processor 1220 may translate a logical address received from the host 1400 into a physical address indicating an area in which data is to be actually stored in the memory device 1100 by driving firmware called as a flash translation layer (FTL). Also, the processor 1220 may store, in the buffer memory 1270, a logical-to-physical address mapping table that establishes a mapping relationship between logical and physical addresses.

The buffer control circuit 1230 may control the buffer memory 1270 under the control of the processor 1220. In connection with a read operation, the buffer control circuit 1230 may receive information indicating that read streaming has been started from the flash DMA 1280. According to the received information, the buffer control circuit 1230 may control the buffer memory 1270 to secure a storage space of data to be received from the flash DMA 1280 in the read operation. In an example, the buffer control circuit 1230 may include a schedule engine (not shown). The schedule engine may control the buffer memory 1270 to secure a storage space for data to be received from the flash DMA 1280 in response to information indicating that read streaming has been started, which is received from the flash DMA 1280. The schedule engine may be implemented with a Tomasulo algorithm or Scoreboard algorithm. In an example, the buffer control circuit 1230 may be disposed in, as a component of, the buffer memory 1270.

The flash control circuit 1240 generates and outputs an internal command for controlling the memory device 1100 of FIG. 1 in response to a command queued by the processor 1220. In an example, the flash control circuit 1240 generates and outputs an internal command for controlling a read operation of the memory device 1100 in response to a read command queued by the processor 1220. In the read operation, the flash control circuit 1240 may control an operation of storing data received from the memory device 1100 through the flash interface 1290 in the buffer memory 1270 by driving the flash DMA 1280. In an example, the flash control circuit 1240 generates and outputs an internal command for controlling a program operation of the memory device 1100 in response to a program command queued by the processor 1220. In the program operation, the flash control circuit 1240 may control an operation of transmitting data stored in the buffer memory 1270 to the memory device 1100 through the flash interface 1290 by driving the flash DMA 1280.

The host interface 1250 is configured to communicate with the host 1400 of FIG. 1 under the control of the processor 1220. The host interface 1250 may be configured to communicate with the host 1400, using at least one of various communication protocols, such as a universal serial bus (USB), a serial AT Attachment (SATA), a high speed interchip (HSIC), a small computer system interface (SCSI), Firewire, a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In the program operation, the host DMA 1260 may perform an operation of storing data received from the host 1400 through the host interface 1250 in the buffer memory 1270 under the control of the host control circuit 1210. In a read operation, the host DMA 1260 may perform an operation of outputting data stored in the buffer memory 1270 to the host 1400 through the host interface 1250 under the control of the host control circuit 1210. In an example, the host DMA 1260 may be disposed in, as a component of, the host control circuit 1210.

The buffer memory 1270 may be used as a working memory, cache memory or data buffer memory of the processor 1220. In a read operation, the buffer memory 1270 may temporarily store data read from the memory device 1100 under the control of the buffer control circuit 1230 and then output the data to the host 1400. In a program operation, the buffer memory 1270 may temporarily store data received from the host 1400 and then output the data to the memory device 1100. The buffer memory 1270 may include a static random access memory (RAM) (SRAM) or dynamic RAM (DRAM). In the embodiment of the present disclosure, the buffer memory 1270 is illustrated and described as a component included in the controller 1200. However, the buffer memory 1270 may be configured as a component separate from the controller 1200. That is, the buffer memory 1270 may be configured as a component disposed externally to and in communication with the controller 1200.

In a program operation, the flash DMA 1280 may perform an operation of outputting data stored in the buffer memory 1270 to the memory device 1100 through the flash interface 1290 under the control of the flash control circuit 1240. In a read operation, the flash DMA 1280 may perform an operation of reading data temporarily stored in the memory device 1100 through the flash interface 1290 and storing the read data in the buffer memory under the control of the flash control circuit 1240. In the read operation, the flash DMA 1280 receives at least one data group, each of which constitutes a read transmission unit (e.g., 4 kilobytes (KB)), from the memory device 1100, divides each data group into multiple, smaller data sub-groups, each having a data size unit of, e.g., 128 bytes (B), and sequentially transmits the data sub-groups to the buffer memory 1270. When the data sub-groups are transmitted to the buffer memory 1270, the flash DMA 1280 may output, to the buffer control circuit 1230, information indicating that read streaming has been started. In an example, the flash DMA 1280 may be included in the flash control circuit 1240 as a component of the flash control circuit 1240.

The flash interface 1290 is configured to communicate with the memory device 1100 of FIG. 1 under the control of the processor 1220. The flash interface 1290 may communicate an internal command, an address, and data with the memory device 1100 through a channel. In an example, the flash interface 1290 may include an error correction code (ECC) circuit (not shown). In a program operation, the ECC circuit may perform ECC encoding on data output to the memory device 1100 of FIG. 1 through the flash interface 1290. The ECC-encoded data may be transferred to the memory device 1100 through the flash interface 1290. In a read operation, the ECC circuit may perform ECC decoding on data received from the memory device 1100 through the flash interface 1290.

Figure 3:
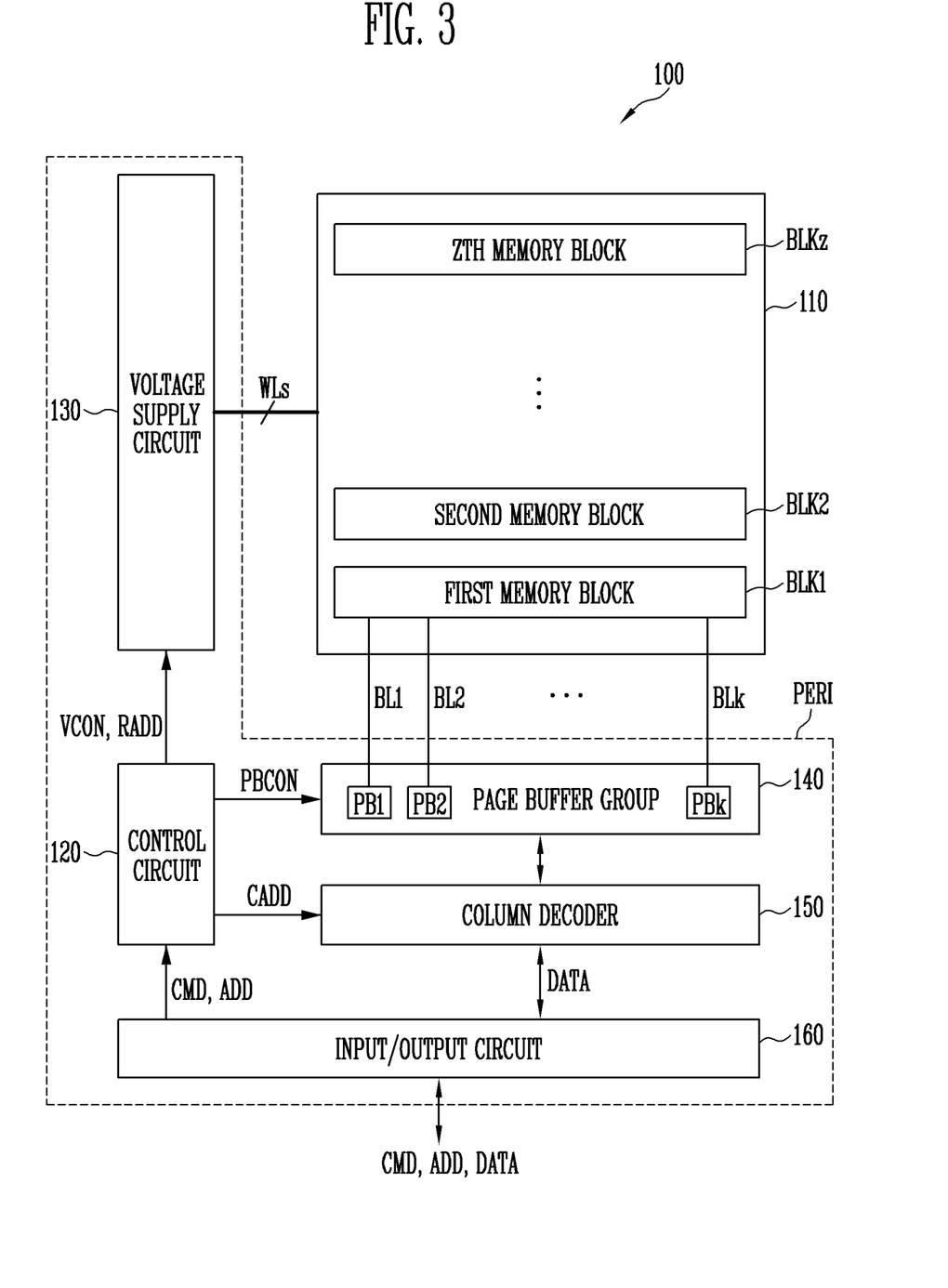
FIG. 3 is a block diagram illustrating a semiconductor memory according to an embodiment of the present disclosure.

FIG. 3 is a block diagram illustrating a semiconductor memory according to an embodiment of the present disclosure, for example, the semiconductor memory 100 of FIG. 1.

Referring to FIG. 3, the semiconductor memory 100 includes a memory cell array 110 including a plurality of memory blocks BLK1 to BLKz, and a peripheral circuit PERI configured to perform a program, read or erase operation of memory cells included in a selected page of the plurality of memory blocks BLK1 to BLKz. The peripheral circuit PERI includes a control circuit 120, a voltage supply circuit 130, a page buffer group 140, a column decoder 150, and an input/output circuit 160.

The memory cell array 110 includes a plurality of memory blocks BLK1 to BLKz. Each of the memory blocks BLK1 to BLKz includes a plurality of pages, each of which includes a plurality of memory cells. In an embodiment, the plurality of memory cells may be nonvolatile memory cells. This will be described in more detail with reference to FIGS. 4 and 5.

The control circuit 120 outputs a voltage control signal VCON for generating a voltage required to perform a read, program or erase operation in response to an internal command CMD received through the input/output circuit 160. The control circuit 120 outputs a page buffer control signal PBCON for controlling page buffers PB1 to PBk in the page buffer group 140 according to the kind of operation. The control circuit 120 outputs a row address signal RADD and a column address signal CADD in response to an address signal ADD received from the outside through the input/output circuit 160. The internal command CMD and the address signal ADD may be generated from the flash control circuit 1240 of FIG. 2 and be received through the flash interface 1290 of FIG. 2.

The voltage supply circuit 130 supplies operating voltages required to perform program, read, and erase operations of memory cells in response to the voltage control signal VCON of the control circuit 120 to local lines including a drain select line, word lines WLs, and a source select line of a selected memory block. The voltage supply circuit 130 includes a voltage generating circuit and a row decoder.

The voltage generating circuit outputs operating voltages required to perform program, read, and erase operations of memory cells to global lines in response to the voltage control signal VCON of the control circuit 120.

The row decoder couples the global lines and the local lines such that the operating voltages output to the global lines by the voltage generating circuit can be transferred to the local lines of the selected memory block in the memory cell array 110, in response to row address signals RADD of the control circuit 120.

The page buffer group 140 includes a plurality of page buffers PB1 to PBk coupled to the memory cell array 110 respectively through bit lines BL1 to BLk. The page buffers PB1 to PBk selectively precharge the bit lines BL1 to BLk according to input data DATA so as to store the data DATA in the memory cells in response to the page buffer control signal PBCON of the control circuit 120. The page buffers PB1 to PBk sense voltages of the bit lines BL1 to BLk so as to read the data DATA from the memory cells. In an example, in a read operation, the page buffer group 140 may temporarily store read data by sensing voltage levels or current amounts of the bit lines BL1 to BLk.

The column decoder 150 selects the page buffers PB1 to PBk included in the page buffer group 140 in response to the column address signal CADD received from the control circuit 120. In a program operation, the column decoder 150 sequentially transfers data DATA to be stored in the memory cells to the page buffers PB1 to PBk in response to the column address signal CADD. In a read operation, the column decoder 150 sequentially selects the page buffers PB1 to PBk in response to the column address signal CADD such that data DATA of the memory cells, which are latched to the page buffers PB1 to PBk, may be output to an external device.

In a program operation, the input/output circuit 160 transfers the data DATA to be stored in the memory cells to the page buffer group 140 through the column decoder 150 under the control of the control circuit 120. When the column decoder 150 transfers the data DATA received from the input/output circuit 160 to the page buffers PB1 to PBk of the page buffer group 140, the page buffers PB1 to PBk store the input data DATA to latch circuits therein. In a read operation, the input/output circuit 160 outputs, to the outside, the data DATA received from the page buffers PB1 to PBk of the page buffer group 140 through the column decoder 150.

Figure 4:
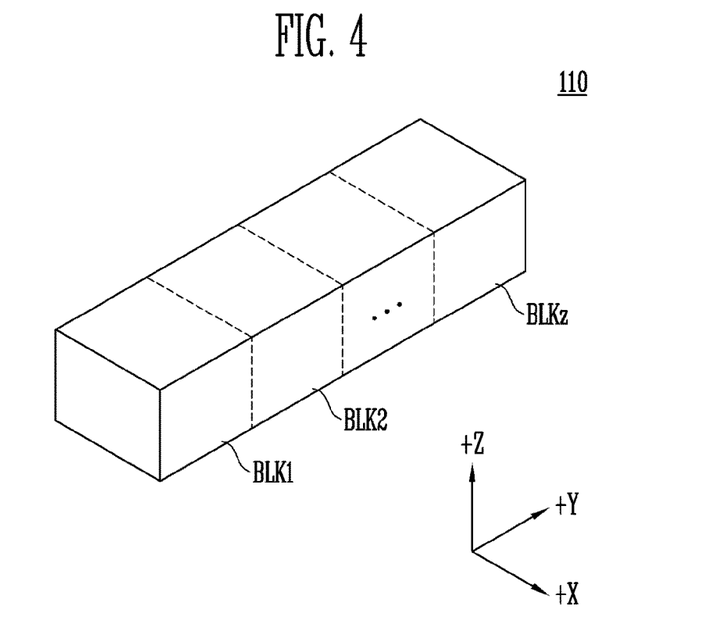
FIG. 4 is a block diagram illustrating a memory cell array according to an embodiment of the present disclosure.

FIG. 4 is a block diagram illustrating a memory cell array according to an embodiment of the present disclosure, for example, the memory cell array 110 of FIG. 3.

Referring to FIG. 4, the memory cell array 110 includes a plurality of memory blocks BLK1 to BLKz. Each memory block has a three-dimensional structure. Each memory block includes a plurality of memory cells stacked above a substrate. The plurality of memory cells are arranged along +X, +Y, and +Z directions. The structure of each memory block will be described in more detail with reference to FIG. 5.

Figure 5:
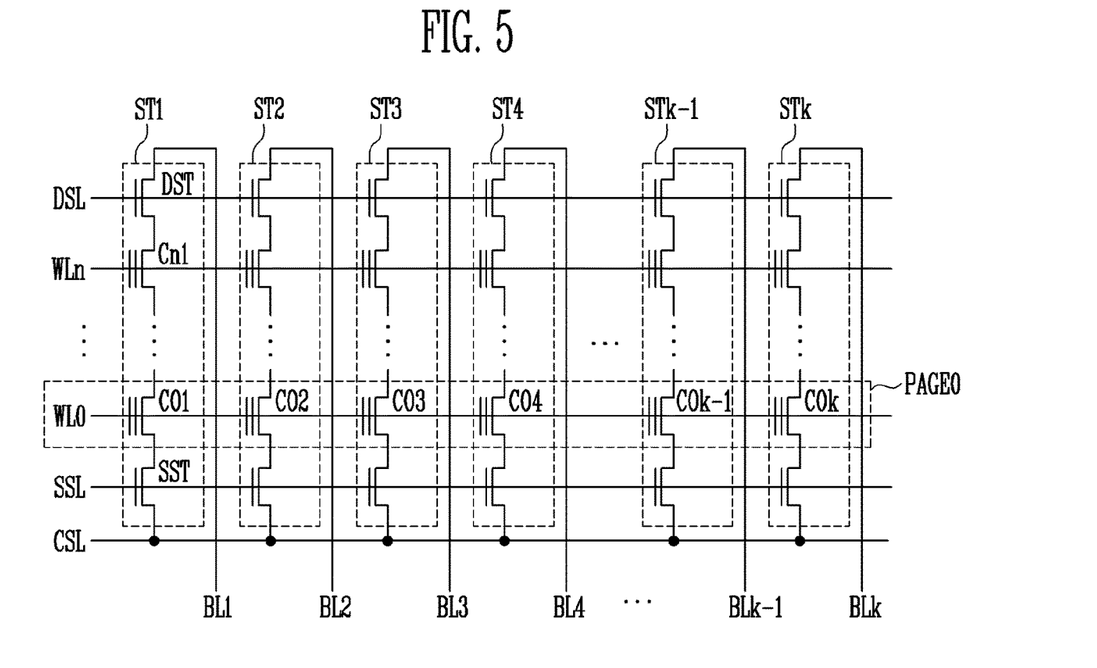
FIG. 5 is a circuit diagram illustrating a memory block according to an embodiment of the present disclosure.

FIG. 5 is a circuit diagram illustrating a memory block according to an embodiment of the present disclosure, for example, the memory block shown in FIG. 4.

Referring to FIG. 5, each memory block includes a plurality of strings ST1 to STk coupled between bit lines BL1 to BLk and a common source line CSL. That is, the strings ST1 to STk are coupled to corresponding bit lines BL1 to BLk, respectively, and are commonly coupled to the common source line CSL. Each string ST1 includes a source select transistor SST having a source coupled to the common source line CSL, a plurality of memory cells C01 to Cn1 and a drain select transistor DST having a drain coupled to the bit line BL1. The memory cells C01 to Cn1 are coupled in series between the select transistors SST and DST. A gate of the source select transistor SST is coupled to a source select line SSL. Gates of the memory cells C01 to Cn1 are coupled to word lines WL0 to WLn, respectively. A gate of the drain select transistor DST is coupled to a drain select line DSL.

Memory cells in a memory block may be divided in units of physical pages or logical pages. For example, the memory cells C01 to C0k coupled to one word line (e.g., WL0) may constitute one physical page PAGE0. Such a page becomes a basic unit of the program operation or the read operation.

Figure 6:
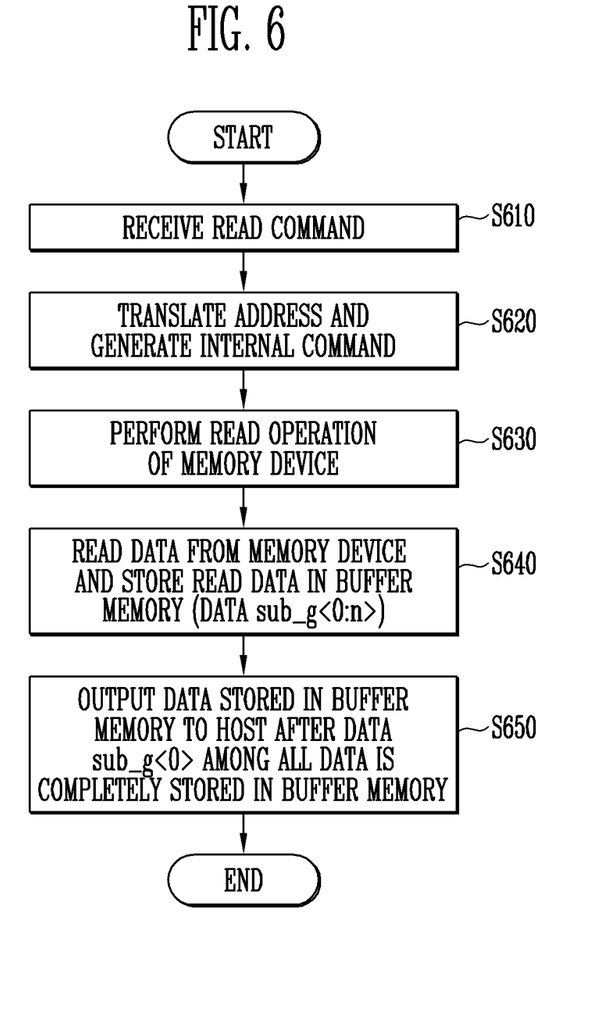
FIG. 6 is a flowchart illustrating an operation of a memory system according to an embodiment of the present disclosure.

FIG. 6 is a flowchart illustrating an operation of a memory system according to an embodiment of the present disclosure.

Figure 7:
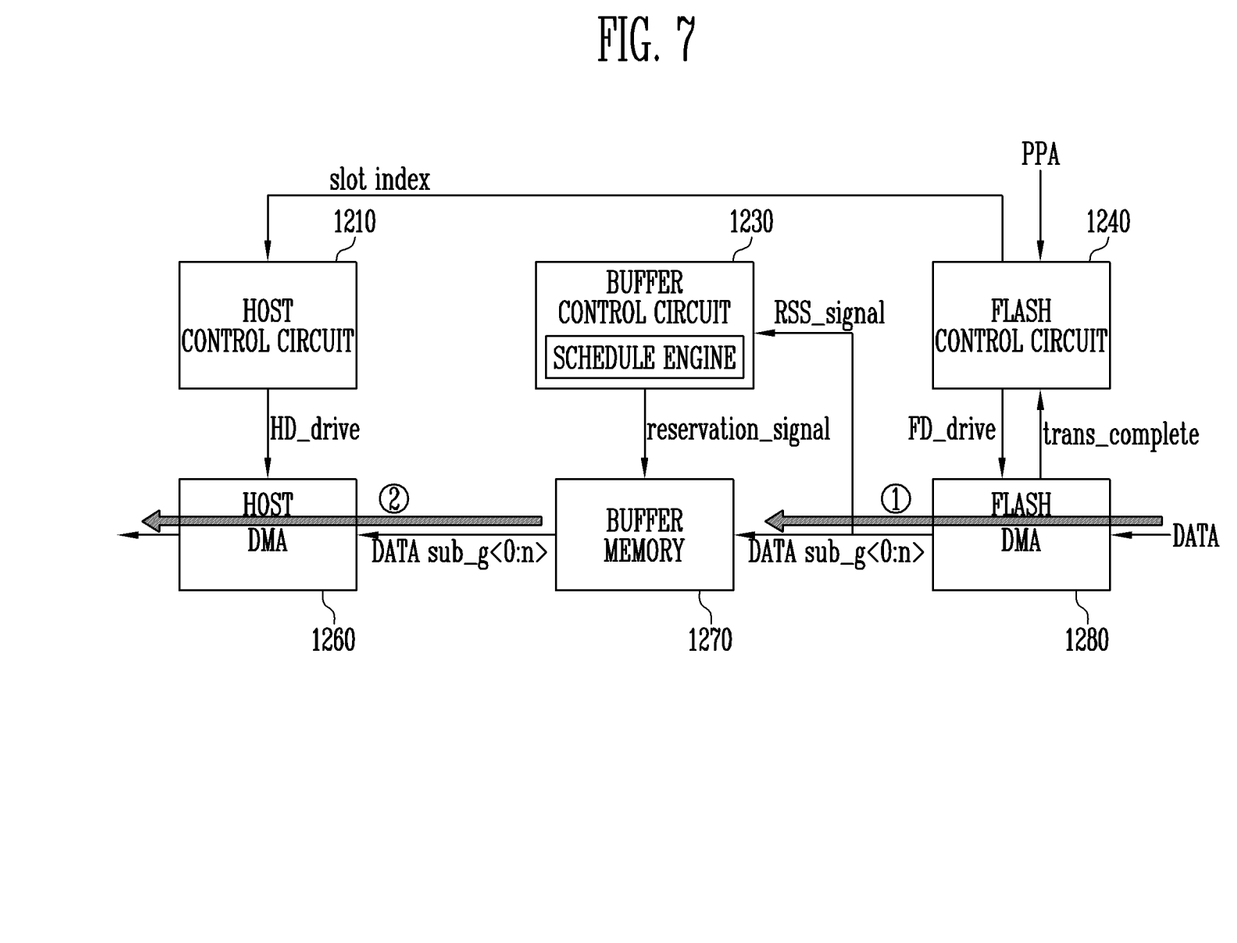
FIG. 7 is a diagram illustrating data transmission in a controller according to an embodiment of the present disclosure.

FIG. 7 is a diagram illustrating data transmission in a controller according to an embodiment of the present disclosure.

A read operation of the memory system according to an embodiment of the present disclosure will be described as follows with reference to FIGS. 1 to 7.

Referring to FIG. 6, the controller 1200 receives a read command and a logical address corresponding to the read command from the host 1400 (S610).

The processor 1220 queues the read command, and generates a physical address (e.g., a physical page address PPA) by translating the logical address. The physical address indicates an area in which data is to be actually stored in the memory device 1100. The flash control circuit 1240 generates an internal command CMD for controlling a read operation of the memory device 1100 and an address ADD according to the queued read command and the physical page address PPA. The flash control circuit 1240 outputs the internal command CMD and the address ADD to the memory device 1100 through the flash interface 1290 (S620).

At least one semiconductor memory, selected among the plurality of semiconductor memories 100 in the memory device 1100, performs a read operation in response to the internal command CMD and the address ADD, which are received from the flash control circuit 1240 (S630).

The control circuit 120 of the semiconductor memory 100 outputs a voltage control signal VCON for generating a voltage to perform a read operation in response to an internal command CMD received through the input/output circuit 160. The control circuit 120 outputs a page buffer control signal PBCON for controlling the page buffers PB1 to PBk in the read operation. Also, the control circuit 120 outputs a row address signal RADD and a column address signal CADD in response to an address signal ADD received from the outside through the input/output circuit 160. The voltage supply circuit 130 supplies operating voltages required to perform an operation of memory cells to local lines including a drain select line, word lines WLs, and a source select line of a selected memory block in response to the voltage control signal VCON of the control circuit 120. In the read operation, the page buffers PB1 to PBk of the page buffer group 140 temporarily stores read data by sensing voltage levels or current amounts of the bit lines BL1 to BLk in response to the page buffer control signal PBCON of the control circuit 120.

The flash control circuit 1240 controls the flash DMA 1280 to read data temporarily stored in the page buffer group 140 of the semiconductor memory 100 on which the read operation has been performed through the flash interface 1290 and store the read data in the buffer memory 1270 (S640).

Referring to FIG. 7, the flash control circuit 1240 drives the flash DMA 1280 by outputting a driving signal FD_drive. The flash DMA 1280 reads and receives data DATA temporarily stored in the page buffer group 140 of the semiconductor memory 100 on which the read operation has been performed through the flash interface 1290. The flash DMA 1280 sequentially receives at least one data group, each of which constitutes a read transmission unit (e.g., 4 KB) from the semiconductor memory 100. The flash control circuit 1240 divides each data group constituting a read transmission unit into multiple data sub-groups DATA sub_g<0:n>, and sequentially transmits the data sub-groups DATA sub_g<0:n> to the buffer memory 1270. That is, the flash control circuit 1240 may divide one data group having a size of a read transmission unit (e.g., 4 KB) into n+1 data sub-groups DATA_sub_g<0:n>, each having a size smaller than that of the read transmission unit, and transmit the data sub-groups DATA_sub_g<0:n> to the buffer memory 1270. In an example, when the read transmission unit is 4 KB and the division data size is 128 bytes, one data group may be divided into 32 data sub-groups DATA sub_g<0:31> to be transmitted to the buffer memory 1270. When a first data sub-group DATA sub_g<0>, among the data sub-groups DATA_sub_g<0:n>, is transmitted to the buffer memory 1270, the flash control circuit 1240 generates a read streaming start signal RSS_signal indicating that read streaming has been started, and outputs the read streaming start signal RSS_signal to the schedule engine of the buffer control circuit 1230. The schedule engine outputs a data storage reservation signal reservation_signal to the buffer memory 1270 to secure a storage space for the data group(s) to be received from the flash DMA 1280, in response to the read streaming start signal RSS_signal. The buffer memory 1270 prepares for a write operation by securing a storage space having a size equal to the total data size of the data group(s), in response to the data storage reservation signal reservation_signal. When the first data sub-group DATA sub_g<0>, among the data sub-groups DATA_sub_g<0:n>, is transmitted to the buffer memory 1270, the flash control circuit 1240 outputs, to the flash control circuit 1240, a transmission completion signal trans_complete indicating that a data transmission operation to the buffer memory 1270 has been completed. The flash control circuit 1240 outputs, to the host control circuit 1210, a slot index including data storage position information of the buffer memory 1270, in response to the transmission completion signal trans_complete.

Referring again to FIG. 6, the host control circuit 1210 controls the host DMA 1260 to read data stored in the buffer memory 1270 and outputs the read data to the host 1400 through the host interface 1250 after at least the first data sub-group DATA_sub_g<0>, among the data sub-groups DATA sub_g<0:n>, is completely stored in the buffer memory 1270 (S650).

Referring again to FIG. 7, the host control circuit 1210 outputs a driving signal HD_drive for driving the host DMA 1260 in response to the slot index. The host DMA 1260 reads and outputs data stored in the buffer memory 1270 in response to the driving signal HD_drive. Since only the first data sub-group DATA sub_g<0>, among the data sub-groups DATA sub_g<0:n>, may be completely stored in the buffer memory 1270, a data storage operation of the other data sub-groups DATA sub_g<1:n> may be performed. Therefore, the buffer memory 1270 may be controlled such that only the data sub-group that has been completely stored is read and output. The host DMA 1260 may sequentially read data sub-groups that have been completely stored in the buffer memory 1270, and output the data sub-groups to the host 1400 through the host interface 1250.

As described above, according to an embodiment of the present disclosure, an operation ① and an operation ② may be performed in parallel at substantially the same time, which may be simultaneously. The operation ① includes transmitting data DATA read from the semiconductor memory 100 to the buffer memory 1270 and storing the data DATA in the buffer memory 1270, which are performed by the flash DMA 1280. The operation ② includes reading data stored in the buffer memory 1270 and outputting the read data to the host 1400, which are performed by the host DMA 1260. That is, the data read from the semiconductor memory 100 is divided into the data sub-groups DATA sub_g<0:n> by the flash DMA 1270 to be sequentially transmitted to the buffer memory 1270, where each of the data sub-groups DATA sub_g<0:n> has a data size smaller than that of the read transmission unit. When the first data sub-group DATA sub_g<0>, among the data sub-groups DATA sub_g<0:n>, is completely transmitted, the host DMA 1260 is driven to read data sub-groups that have been completely transmitted from the buffer memory 1270 and output the read data sub-groups to the host 1400. Thus, an operation in which the data sub-groups DATA sub_g<1:n> are stored in the buffer memory 1270 and an operation in which the data sub-groups DATA sub_g<0:n−1> are read from the buffer memory 1270 to be output to the host 1400 are performed in parallel. In short, second through nth data sub-groups are stored in the buffer memory 1270, while first through (n−1)th data sub-groups are read from the buffer memory 1270. Thus, the read operation speed of the memory system 1000 may be improved.

Figure 8:
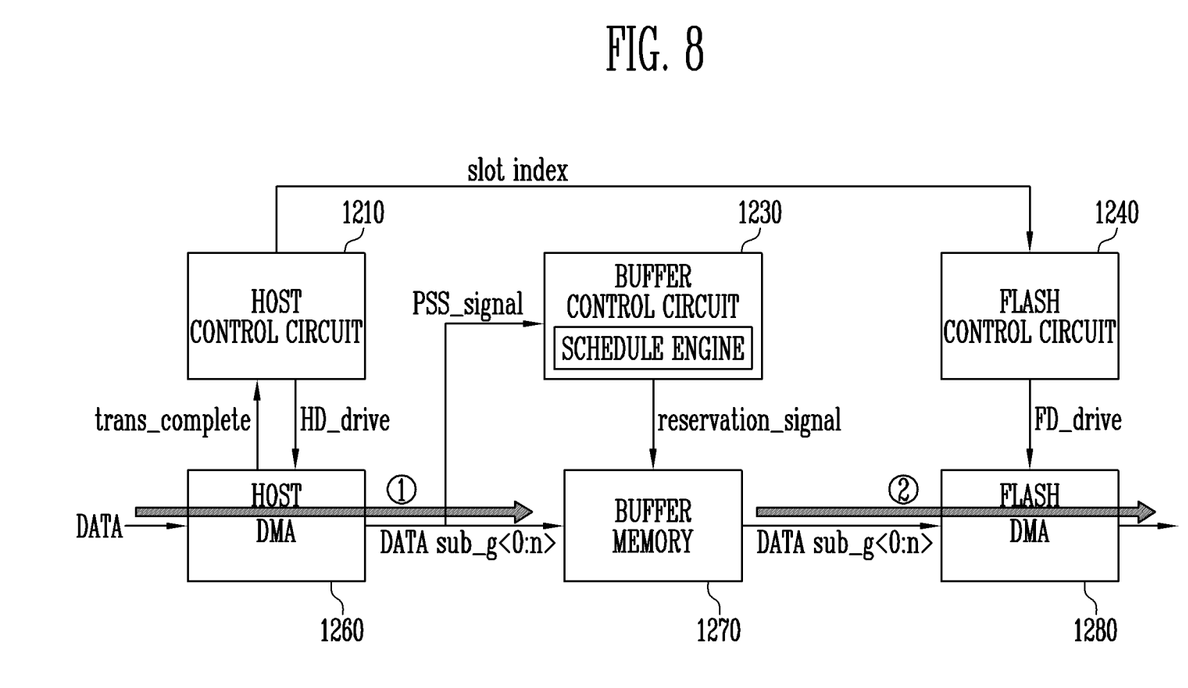
FIG. 8 is a diagram illustrating data transmission in a controller according to an embodiment of the present disclosure.

FIG. 8 is a diagram illustrating data transmission in a controller according to an embodiment of the present disclosure.

In FIG. 8, the controller receives data DATA from the host, temporarily stores the data DATA, and outputs the data DATA to the memory device.

Referring to FIG. 8, the host control circuit 1210 drives the host DMA 1260 by outputting a driving signal HD_drive. The host DMA 1260 receives data DATA received from the host 1400 of FIG. 1 through the host interface 1250 of FIG. 2. The host DMA 1260 sequentially receives at least one data group having a size of a transmission unit (e.g., 4 KB) from the host 1400. The host control circuit 1210 divides the data group into multiple data sub-groups DATA sub_g<0:n>, and sequentially transmits the data sub-groups DATA sub_g<0:n> to the buffer memory 1270. That is, the host control circuit 1210 may divide one data group having a size of the transmission unit (e.g., 4 KB) into n+1 data sub-groups DATA sub_g<0:n>, each having a size smaller than that of the transmission unit, and transmit the data sub-groups DATA sub_g<0:n> to the buffer memory 1270. In an example, when the transmission unit is 4 KB and the division data size is 128 bytes, one data group may be divided into 32 data sub-groups DATA sub_g<0:31> to be transmitted to the buffer memory 1270. When a first data sub-group DATA sub_g<0>, among the at least two data sub-groups DATA_sub_g<0:n>, is transmitted to the buffer memory 1270, the host control circuit 1210 generates a program streaming start signal PSS_signal indicating that program streaming has been started, and outputs the program streaming start signal PSS_signal to the schedule engine of the buffer control circuit 1230. The schedule engine outputs a data storage reservation signal reservation_signal to the buffer memory 1270 to secure a storage space of at least one data group to be received from the host DMA 1260, in response to the program streaming start signal PSS_signal. The buffer memory 1270 prepares for a write operation by securing a storage space having a size equal to the total data size of the data group(s), in response to the data storage reservation signal reservation_signal. When the first data sub-group DATA sub_g<0>, among the data sub-groups DATA_sub_g<0:n>, is transmitted to the buffer memory 1270, the host DMA 1260 outputs, to the host control circuit 1210, a transmission completion signal trans_complete indicating that a data transmission operation to the buffer memory 1270 has been completed. The host control circuit 1210 outputs, to the flash control circuit 1240, a slot index including data storage position information of the buffer memory 1270, in response to the transmission completion signal trans_complete.

The flash control circuit 1240 controls the flash DMA 1280 to read data stored in the buffer memory 1270 and outputs the read data to the memory device through the flash interface 1290 of FIG. 2 after at least the first data sub-group DATA_sub_g<0>, among the data sub-groups DATA sub_g<0:n>, is completely stored in the buffer memory 1270.

The flash control circuit 1240 outputs a driving signal FD_drive for driving the flash DMA 1280 in response to the slot index. The flash DMA 1280 reads and outputs data stored in the buffer memory 1270 in response to the driving signal FD_drive. Since only the first data sub-group DATA sub_g<0>, among the at least two data sub-groups DATA sub_g<0:n>, may be completely stored in the buffer memory 1270, a data storage operation of the other data sub-groups DATA sub_g<1:n> may be performed. Therefore, the buffer memory 1270 may be controlled such that only the data sub-group that has been completely stored is read and output. The flash DMA 1280 may sequentially read data sub-groups that have been completely stored in the buffer memory 1270, and output the data sub-groups to the memory device 1100 through the flash interface 1290.

As described above, according to an embodiment of the present disclosure, an operation ① and an operation ② may be performed in parallel at substantially the same time, which may be simultaneously. The operation ① includes transmitting data DATA received from the host to the buffer memory 1270 and storing the data DATA in the buffer memory 1270, which are performed by the host DMA 1260. The operation ② includes reading data stored in the buffer memory 1270 and outputting the read data to the memory device 1100, which are performed by the flash DMA 1280. That is, the data received from the host 1400 is divided into the data sub-groups DATA sub_g<0:n>, each having a data size smaller than that of the transmission unit by the host DMA 1260 to be sequentially transmitted to the buffer memory 1270. When the first data sub-group DATA sub_g<0>, among the data sub-groups DATA sub_g<0:n> is completely transmitted, the flash DMA 1280 is driven to read data sub-groups that have been completely transmitted from the buffer memory 1270 and output the read data sub-groups to the memory device 1100. Thus, an operation in which the data sub-groups DATA sub_g<1:n> are stored in the buffer memory 1270 and an operation in which the data sub-groups DATA sub_g<0:n−1> are read from the buffer memory 1270 to be output to the memory device are performed in parallel. In short, second through nth data sub-groups are stored in the buffer memory 1270, while first through (n−1)th data sub-groups are read from the buffer memory 1270. Thus, the read operation speed of the memory system 1000 may be improved.

In the above-described embodiments, operations of outputting data received from the host to the memory device or outputting data received from the memory device to the host have been described as examples. However, the present disclosure is not limited thereto, and may be applied to other operations of transmitting data using a buffer. In addition, when a decoding operation is performed on data read from the memory device using an error correction block, or when an encoding operation is performed on data received from the host using an error correction code, the data may be transmitted as explained above, so that the operation speed of data transmission for the decoding operation and the encoding operation may be improved.

Figure 9:
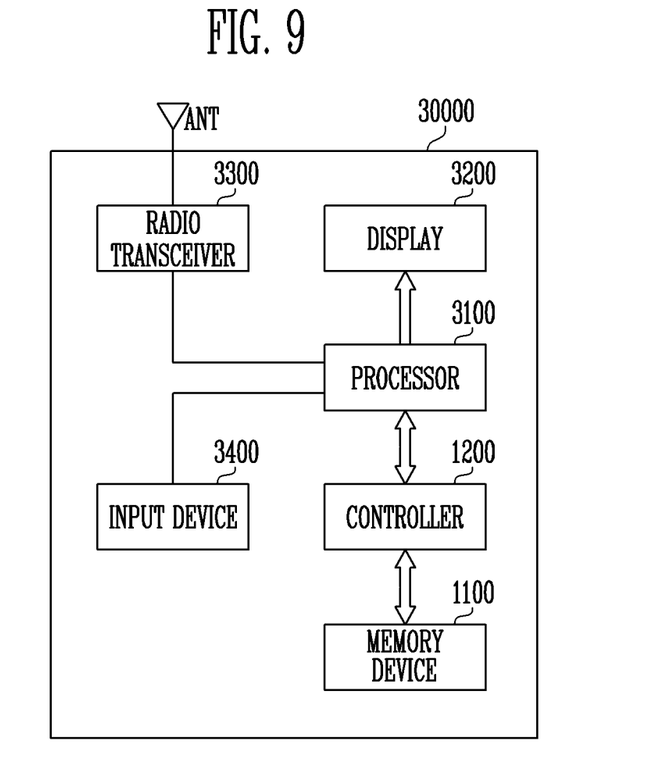
FIG. 9 is a diagram illustrating an exemplary memory system in which aspects of the present disclosure may be implemented.

FIG. 9 is a diagram illustrating a memory system 30000 according to an embodiment of the present disclosure.

Referring to FIG. 9, the memory system 30000 may be implemented as a cellular phone, a smart phone, a tablet personal computer (PC), a personal digital assistant (PDA), or a wireless communication device. The memory system 30000 may include a memory device 1100 and a controller 1200 capable of controlling an operation of the memory device 1100. The controller 1200 may control a data access operation of the memory device 1100, e.g., a program operation, an erase operation, a read operation, or the like under the control of a processor 3100.

Data programmed in the memory device 1100 may be output through a display 3200 under the control of the controller 1200.

A radio transceiver 3300 may transmit and receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the controller 1200 or the display 3200. The controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the controller 1200, data output from the radio transceiver 3300, or data output from the input device 3400 can be output through the display 3200.

In some embodiments, the controller 1200 capable of controlling an operation of the memory device 1100 may be implemented as a part of the processor 3100, or be implemented as a chip separate from the processor 3100. Also, the controller 1200 may be implemented with the controller shown in FIG. 2.

Figure 10:
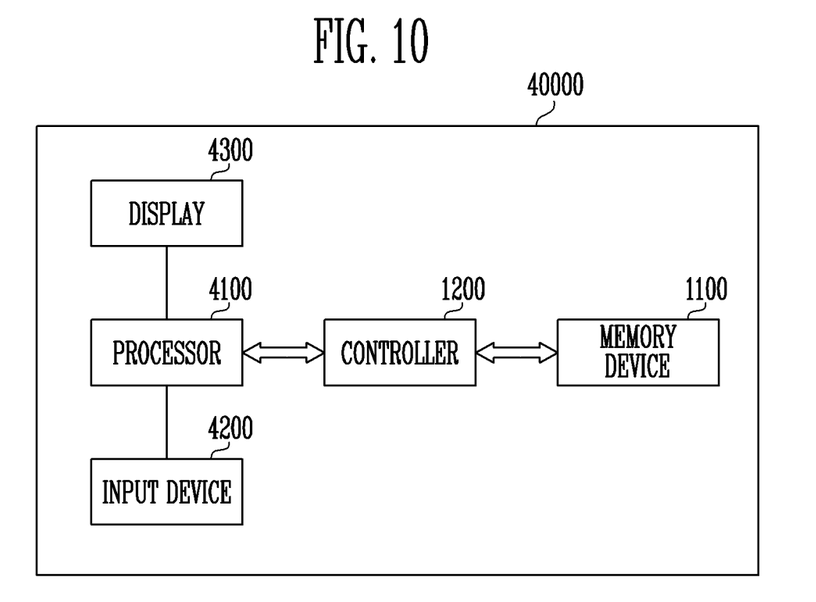
FIG. 10 is a diagram illustrating another example of a memory system in which aspects of the present disclosure may be implemented.

FIG. 10 is a diagram illustrating a memory system 40000 according to an embodiment of the present disclosure.

Referring to FIG. 10, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 and a controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the controller 1200. In some embodiments, the controller 1200 capable of controlling an operation of the memory device 1100 may be implemented as a part of the processor 4100, or be implemented as a chip separate from the processor 4100. Also, the controller 1200 may be implemented with the controller shown in FIG. 2.

Figure 11:
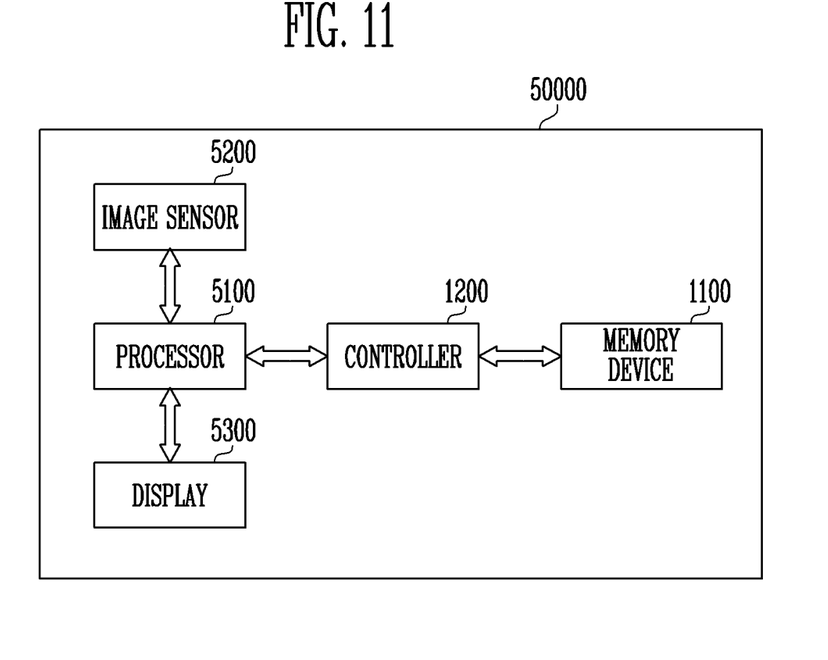
FIG. 11 is a diagram illustrating another example of a memory system in which aspects of the present disclosure may be implemented.

FIG. 11 is a diagram illustrating a memory system 50000 according to an embodiment of the present disclosure.

Referring to FIG. 11, the memory system 50000 may be implemented as an image processing device, e.g., a digital camera, a mobile terminal having a digital camera attached thereto, a smart phone having a digital camera attached thereto, or a tablet personal computer (PC) having a digital camera attached thereto.

The memory system 50000 may include a memory device 1100 and a controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the memory device 1100 through the controller 1200. In addition, data stored in the memory device 1100 may be output through the display 5300 under the control of the processor 5100 or the controller 1200.

In some embodiments, the controller 1200 capable of controlling an operation of the memory device 1100 may be implemented as a part of the processor 5100, or be implemented as a chip separate from the processor 5100. Also, the controller 1200 may be implemented with the controller shown in FIG. 2.

Figure 12:
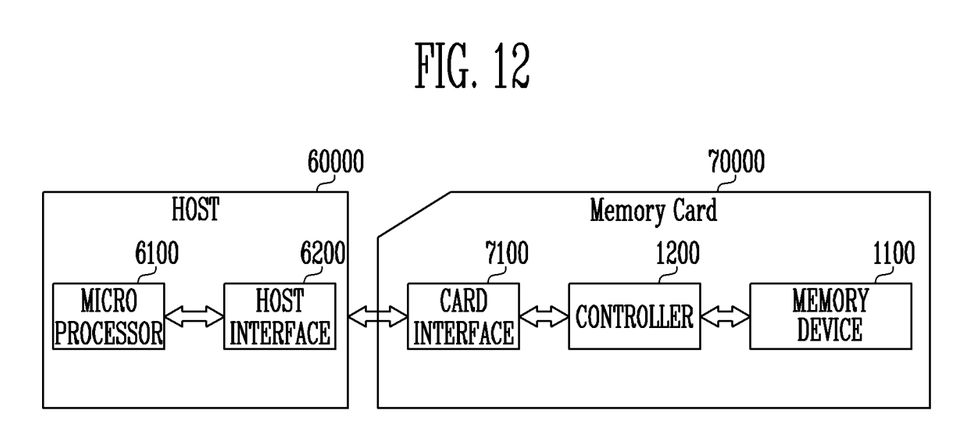
FIG. 12 is a diagram illustrating another example of a memory system in which aspects of the present disclosure may be implemented.

FIG. 12 is a diagram illustrating a memory system 70000 according to an embodiment of the present disclosure.

Referring to FIG. 12, the memory system 70000 may be implemented as a memory card or a smart card. The memory system 70000 may include a memory device 1100, a controller 1200, and a card interface 7100.

The controller 1200 may control data exchange between the memory device 1100 and the card interface 7100. In some embodiments, the card interface 7100 may be a secure digital (SD) card interface or a multi-media card (MMC) interface, but the present disclosure is not limited thereto. Also, the controller 1200 may be implemented with the controller shown in FIG. 2.

The card interface 7100 may interface data exchange between a host 60000 and the controller 1200 according to a protocol of the host 60000. In some embodiments, the card interface 7100 may support a universal serial bus (USB) protocol and an inter-chip (IC)-USB protocol. The card interface 7100 may include hardware capable of supporting a protocol used by the host 60000, software embedded in the hardware, or a signal transmission scheme.

When the memory system 70000 is coupled to a host interface 6200 of the host 60000 such as a personal computer (PC), a tablet PC, a digital camera, a digital audio player, a cellular phone, console video game hardware, or a digital set-top box, the host interface 6200 may perform data communication with the memory device 1100 through the card interface 7100 and the controller 1200 under the control of a microprocessor 6100.

According to embodiments of the present disclosure, the speed of a read operation may be improved by processing, in parallel, an operation of storing data from the memory device to the buffer memory and an operation of outputting data from the buffer memory to the host.

Various embodiments have been disclosed herein, and although specific terms are employed, they are used and are to be interpreted in a generic and descriptive sense and not for purpose of limitation. In some instances, as would be apparent to one skilled in the art in light of the present disclosure, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
    a memory device configured to perform a read operation of reading data and outputting the data in a read transmission unit; and
    a controller configured to control the memory device to perform the read operation in response to a read command output from a host,
    wherein the controller includes:
    a buffer memory configured to temporarily store the data;
    a first flash direct memory access (DMA) controller configured to divide the data into a plurality of data sub-groups each having a size smaller than the read transmission unit, to sequentially output the plurality of data sub-groups to the buffer memory, and to generate a read streaming start signal indicating that output of the data is started and a slot index indicating a position where the data is to be stored in the buffer memory;
    a buffer controller configured to control the buffer memory to allocate a storage space corresponding to a size of the data in response to the read streaming start signal; and
    a second DMA controller configured to sequentially transfer the plurality of data sub-groups input to the buffer memory to the host in response to the slot index;
    wherein, when the second DMA controller sequentially transfers the plurality of data sub-groups to the host, some data sub-groups among the plurality of data sub-groups are stored in the buffer memory.

2. The memory system of claim 1, wherein the first DMA controller further includes:
    a flash DMA configured to divide the data into the plurality of data sub-groups, to sequentially output the plurality of data sub-groups to the buffer memory, and to generate the read streaming start signal and the slot index; and
    a flash controller configured to control the flash DMA.

3. The memory system of claim 1, wherein the second DMA controller further includes:
    a host DMA configured to sequentially transfer the plurality of data sub-groups to the host; and
    a host controller configured to control the host DMA.

4. The memory system of claim 1, wherein the read transmission unit is 4 kilobytes, and
    wherein the size of each of the plurality of data sub-groups is 128 bytes.

5. The memory system of claim 1, wherein the buffer controller outputs a storage reservation signal instructing to allocate the storage space in response to the read streaming start signal to the buffer memory.

6. The memory system of claim 5, wherein the buffer controller includes a schedule engine implemented with a Tomasulo algorithm or Scoreboard algorithm.

7. A memory system comprising:
    a memory device configured to perform a program operation of storing data; and
    a controller configured to control the memory device to perform the program operation in response to a program command output from a host,
    wherein the controller includes:
    a buffer memory configured to temporarily store the data;
    a first direct memory access (DMA) controller configured to divide the data output from the host into a plurality of data sub-groups each having a size smaller than a transmission unit, to sequentially output the plurality of data sub-groups to the buffer memory, and to generate a program streaming start signal indicating that output of the data is started and a slot index indicating a position where the data is to be stored in the buffer memory;

a buffer controller configured to control the buffer memory to allocate a storage space corresponding to a size of the data in response to the program streaming start signal; and a second DMA controller configured to sequentially transfer the plurality of data sub-groups input to the buffer memory to the memory device in response to the slot index;

wherein, when the second DMA controller sequentially transfers the plurality of data sub-groups to the memory device, some data sub-groups among the plurality of data sub-groups are stored in the buffer memory.

8. The memory system of claim 7, wherein the first DMA controller further includes:

a host DMA configured to divide the data into the plurality of data sub-groups, to sequentially output the plurality of data sub-groups to the buffer memory, and to generate the program streaming start signal and the slot index; and a host controller configured to control the host DMA.

9. The memory system of claim 7, wherein the second DMA controller further includes:

a flash DMA configured to sequentially transfer the plurality of data sub-groups to the memory device; and a flash controller configured to control the flash DMA.

10. The memory system of claim 7, wherein the transmission unit is 4 kilobytes, and wherein the size of each of the plurality of data sub-groups is 128 bytes.

11. The memory system of claim 7, wherein the buffer controller outputs a storage reservation signal instructing to allocate the storage space in response to the program streaming start signal to the buffer memory.

12. The memory system of claim 11, wherein the buffer controller includes a schedule engine implemented with a Tomasulo algorithm or Scoreboard algorithm.

* * * * *